(12) United States Patent
Sugishita et al.

(10) Patent No.: US 12,077,208 B2
(45) Date of Patent: Sep. 3, 2024

(54) STEERING DEVICE (71) Applicant: NSK LTD., Tokyo (JP)

(72) Inventors: Suguru Sugishita, Gunma (JP);
Hirotaka Shimizu, Gunma (JP);
Kouhei Takeishi, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/275,710

(22) PCT Filed: Feb. 2, 2022

(86) PCT No.: PCT/JP2022/003987
§ 371 (c)(1),
(2) Date: Aug. 3, 2023

(87) PCT Pub. No.: WO2022/168850
PCT Pub. Date: Aug. 11, 2022

(65) Prior Publication Data
US 2024/0116557 A1   Apr. 11, 2024

(30) Foreign Application Priority Data

Feb. 4, 2021 (JP) ................. 2021-016247

(51) Int. Cl.
*B62D 1/20* (2006.01)
(52) U.S. Cl.
CPC ...................... *B62D 1/20* (2013.01)
(58) Field of Classification Search
CPC .......... B62D 1/20; B62D 1/16; B62D 5/0403; B62D 1/19
See application file for complete search history.

(56) References Cited

U.S. PATENT DOCUMENTS

| 3,492,888 | A | * | 2/1970 | Nishimura | B62D 1/192 188/371 |
| 3,600,970 | A | * | 8/1971 | Loofbourrow | B62D 1/192 188/371 |
| 3,635,314 | A | * | 1/1972 | Mazelsky | B62D 1/192 293/133 |
| 3,665,778 | A | * | 5/1972 | Bohan | B62D 1/192 403/329 |

(Continued)

FOREIGN PATENT DOCUMENTS

| EP | 3222494 A2 | * | 9/2017 | ............ B62D 1/184 |
| GB | 2269140 A | * | 2/1994 | ............ B62D 1/192 |

(Continued)

OTHER PUBLICATIONS

International Search Report for PCT/JP2022/003987, Apr. 5, 2022.

*Primary Examiner* — Jason D Shanske
*Assistant Examiner* — Shams Dhanani
(74) *Attorney, Agent, or Firm* — Sughrue Mion, PLLC (57) ABSTRACT

A steering device includes a cylindrical steering column that extends in an axial direction. The steering column includes: an upper column; a lower column; and a fixing member. The fixing member includes a cylindrical part, and the cylindrical part includes: a small diameter part that is fitted to the lower column; a curved part that has an outer circumferential surface whose outer diameter increases toward the other side in the axial direction; and a large diameter part whose outer diameter is larger than an outer diameter of the small diameter part.

6 Claims, 12 Drawing Sheets

(56) References Cited

U.S. PATENT DOCUMENTS

| | | | | |
|---|---|---|---|---|
| 3,699,824 A * | 10/1972 | Staudenmayer | ....... | B62D 1/192 74/492 |
| 3,877,319 A * | 4/1975 | Cooper | ................. | B62D 1/192 188/371 |
| 4,003,537 A * | 1/1977 | Mutchnik | ............... | F16B 9/052 248/188 |
| 4,189,249 A * | 2/1980 | Gaines | ...................... | F16C 7/02 228/178 |
| 4,991,871 A * | 2/1991 | Sadakata | ................ | B62D 1/192 74/492 |
| 5,273,330 A * | 12/1993 | Petry | ......................... | F16B 9/01 293/133 |
| 5,413,417 A * | 5/1995 | Labedan | ................. | F16C 19/26 384/624 |
| 8,833,507 B2 * | 9/2014 | Sekikawa | ........... | B62D 5/0409 180/443 |
| 9,233,709 B2 * | 1/2016 | Ishii | ..................... | B62D 5/0403 |
| 10,696,213 B2 | 6/2020 | Massonnaud et al. | | |
| 11,173,950 B2 * | 11/2021 | Kim | ..................... | F16H 57/039 |
| 11,788,585 B2 * | 10/2023 | Sato | ..................... | F16J 15/3232 192/45.004 |
| 2002/0173362 A1 * | 11/2002 | Sadakata | ................ | F16D 3/387 464/84 |
| 2003/0110584 A1 | 6/2003 | Clare et al. | | |
| 2004/0182637 A1 * | 9/2004 | Yamamori | ........... | B62D 5/0409 180/421 |
| 2005/0235768 A1 * | 10/2005 | Shimizu | ............... | B62D 5/0409 74/425 |
| 2007/0066409 A1 * | 3/2007 | Sekine | ................. | F16D 1/0864 464/179 |
| 2009/0107756 A1 * | 4/2009 | Miyoshi | ................. | H02K 29/12 180/444 |
| 2009/0260914 A1 * | 10/2009 | Streng | ................. | B62D 5/0403 180/444 |
| 2009/0266640 A1 * | 10/2009 | Oshima | ................ | B62D 5/0403 180/444 |
| 2011/0240399 A1 * | 10/2011 | Suzuki | ..................... | F16D 3/68 180/444 |
| 2012/0272765 A1 * | 11/2012 | Fuechsel | ............... | F16C 35/045 74/416 |
| 2014/0260757 A1 * | 9/2014 | Stinebring | ............ | F16C 33/583 74/492 |
| 2015/0069745 A1 * | 3/2015 | Iwakawa | ................ | B62D 1/185 280/775 |
| 2017/0175821 A1 * | 6/2017 | Segawa | ................ | B62D 5/0409 |
| 2018/0194387 A1 * | 7/2018 | Kwon | .................. | B62D 5/0409 |
| 2018/0259061 A1 * | 9/2018 | Rey | ..................... | F16H 57/0464 |
| 2018/0312189 A1 * | 11/2018 | Geiger | ................. | F16C 11/045 |
| 2019/0226571 A1 * | 7/2019 | Appleyard | .............. | F16C 19/36 |
| 2020/0039575 A1 * | 2/2020 | Doornbos | ................. | F16D 3/54 |
| 2020/0047789 A1 * | 2/2020 | Yoshida | ................... | B62D 1/20 |
| 2020/0094866 A1 * | 3/2020 | Kurokawa | ............. | B62D 1/185 |
| 2020/0283064 A1 * | 9/2020 | Boyle | ..................... | B62D 5/008 |
| 2020/0339180 A1 * | 10/2020 | Buys | ...................... | B62D 1/195 |
| 2021/0139072 A1 * | 5/2021 | Segawa | ................. | F16D 3/54 |
| 2021/0293319 A1 * | 9/2021 | Cheon | ................. | B62D 5/0409 |
| 2024/0059344 A1 * | 2/2024 | Morishima | ........... | B62D 1/195 |

FOREIGN PATENT DOCUMENTS

| | | | | |
|---|---|---|---|---|
| GB | 2293339 A * | 3/1996 | ............. | B21K 1/10 |
| GB | 2353768 A * | 3/2001 | ............. | B62D 1/192 |
| GB | 2459959 A * | 11/2009 | ............. | B62D 1/16 |
| JP | 2002-081420 A | 3/2002 | | |
| JP | 2004-136749 A | 5/2004 | | |
| JP | 2005-502415 A | 1/2005 | | |
| JP | 2007-276591 A | 10/2007 | | |
| JP | 2013-035486 A | 2/2013 | | |
| WO | WO-9620862 A1 * | 7/1996 | ............. | B62D 1/192 |
| WO | WO-9626852 A2 * | 9/1996 | ....... | B60R 25/02107 |
| WO | 2008/146664 A1 | 12/2008 | | |
| WO | 2017/072032 A1 | 5/2017 | | |
| WO | WO-2018156882 A1 * | 8/2018 | | |

* cited by examiner

STEERING DEVICE

CROSS REFERENCE TO RELATED APPLICATIONS

This application is a National Stage of International Application No. PCT/JP2022/003987 filed Feb. 2, 2022, claiming priority based on Japanese Patent Application No. 2021-016247 filed Feb. 4, 2021.

FIELD

The present invention relates to a steering device.

BACKGROUND

The steering device of Patent Literature 1 includes: the steering shaft that is connected to the steering wheel and extends in the axial direction; and the cylindrical steering column that is supported on the outer circumferential side of the steering shaft via the bearing. The steering column includes: the upper column that is disposed on the steering wheel side; the lower column that is disposed on the front side of the upper column and partially fitted to the inner circumferential side of the upper column; and the sensor housing that is disposed on the front side of the lower column and partially fitted to the inner circumferential side of the lower column. The sensor housing includes the cylindrical part, and the cylindrical part includes: the small diameter part; the medium diameter part; and the large diameter part. The front end part of the lower column is fitted to the small diameter part. The outer diameters of the medium diameter part and the large diameter part are larger than the outer diameter of the lower column.

CITATION LIST

Patent Literature

Patent Literature 1: JP 2007-276591 A

SUMMARY

Technical Problem

At the time of a secondary collision, a force is applied to the steering wheel from a driver toward the front of the vehicle, and the upper column slides forward on the outer circumferential side of the lower column. Here, since the outer diameters of the medium diameter part and the large diameter part are larger than the outer diameter of the lower column, the front end of the upper column may interfere with the medium diameter part or the large diameter part when the upper column slides. For this reason, a steering device in which a moving length of an upper column at the time of a secondary collision is longer has been requested.

The present disclosure has been made in view of the above problem, and aims to provide a steering device in which a moving length of an upper column at the time of a secondary collision is longer.

Solution to Problem

To achieve the above object, a steering device according to an embodiment of the present disclosure comprising: a steering shaft that extends along a central axis and is connected on one side in an axial direction thereof to a steering wheel; a cylindrical steering column that is disposed on an outer circumferential side of the steering shaft and extends in the axial direction; and a gear box that is disposed on the other side in the axial direction of the steering column and fixed to the steering column, wherein the steering column includes: an upper column; a lower column that is disposed on the other side in the axial direction of the upper column and partially fitted to an inner circumferential side of the upper column; and a fixing member that is provided on the other side in the axial direction of the lower column and fixed to the gear box, the fixing member includes a cylindrical part that extends in the axial direction, the cylindrical part includes: a small diameter part that is fitted to an inner circumferential side of the lower column; a curved part that is adjacent to the other side in the axial direction of the small diameter part and has an outer circumferential surface whose outer diameter increases toward the other side in the axial direction thereof; and a large diameter part that is adjacent to the other side in the axial direction of the curved part and has an outer diameter larger than the outer diameter of the small diameter part, in a cross section including the central axis, the outer circumferential surface of the curved part is an arc, and a tangent line at an end on the one side in axial direction of the arc coincides with an outer circumferential surface of the small diameter part, and the outer diameter of the large diameter part is smaller than an outer diameter of the lower column.

At the time of a secondary collision, a force is applied from a driver to the steering wheel toward the front of the vehicle. In this case, the force is transmitted from the steering wheel to the upper column via the steering shaft. The upper column is fitted to the outer circumferential side of the lower column, but when the force transmitted to the upper column becomes larger than the force by which the upper column is fitted to the lower column, the upper column slides forward on the outer circumferential side of the lower column.

Here, when the outer diameter of the large diameter part is smaller than the outer diameter of the lower column, the upper column can move to the vicinity of the disk part without interfering with the large diameter part when the upper column moves forward. Thus, the moving length (stroke amount) of the upper column at the time of the secondary collision increases as compared with the case where the outer diameter of the large diameter part is larger than the outer diameter of the lower column.

As a desirable embodiment of the steering device, a difference between a radius of the large diameter part and a radius of the small diameter part is a first length, and in the cross section including the central axis, a curvature radius of the arc being the outer circumferential surface of the curved part is larger than the first length.

When the outer diameter of the large diameter part is smaller than the outer diameter of the lower column, the thickness of the large diameter part in the radial direction decreases, and the rigidity of the large diameter part decreases. As a result, when the lower column is fitted to the fixing member, when a force is applied to the fixing member via the lower column during traveling of the vehicle, and so forth, the force concentrates on the curved part located between the large diameter part and the small diameter part. For this reason, the outer circumferential surface of the curved part is formed in an arc shape having a large curvature radius, and the step at the boundary portion between the curved part and the small diameter part is made as small as possible. As a result, even when the force concentrates on the curved part, it is possible to further suppress deformation and damage of the curved part.

As a desirable embodiment of the steering device, an end on the other side in the axial direction of the lower column is located close to the one side in the axial direction with respect to an end on the one side in the axial direction of the curved part.

When the lower column is fitted to the cylindrical part of the fixing member at the time of manufacturing the steering device, if the lower column is fitted to a region of the curved part, the shape of the curved part is deformed. Thus, by arranging the lower column at a position spaced apart from the curved part in the axial direction, it is possible to suppress deformation of the curved part at the time of manufacturing the steering device.

As a desirable embodiment of the steering device, the fixing member includes a disk part that is provided on the other side in the axial direction of the cylindrical part and extends in a radial direction, and the disk part includes a rib that protrudes from a surface on the one side in the axial direction thereof to the one side in the axial direction and radially outward. According to this aspect, since the rib is formed across the disk part and the cylindrical part, the rigidity of the disk part and the cylindrical part is improved by the rib.

As a desirable embodiment of the steering device, the upper column includes a protruding part, capable of housing the rib therein, at an end part on the other side in the axial direction thereof. According to this aspect, it is possible to suppress interference between the upper column and the rib when the upper column moves forward with respect to the lower column at the time of the secondary collision.

Advantageous Effects of Invention

According to the present disclosure, it is possible to provide a steering device in which a moving length of an upper column at the time of a secondary collision is longer.

DESCRIPTION OF EMBODIMENTS

Hereinafter, the present invention will be described in detail with reference to the drawings. Note that, the present invention is not limited by the following modes for carrying out the invention (hereinafter, referred to as embodiments). In addition, constituents in the following embodiments include those that can be easily assumed by those skilled in the art, those that are substantially the same, and those within a so-called equivalent range. Further, the constituents disclosed in the following embodiments can be combined as appropriate. Note that, in the following description, an XYZ orthogonal coordinate system is used. The X axis is parallel to the axis of a steering shaft. The Y axis is parallel to a vehicle width direction of a vehicle on which a steering device is mounted. The Z axis is perpendicular to both the X axis and the Y axis. A direction parallel to the X axis is described as an X direction, a direction parallel to the Y axis is described as a Y direction, and a direction parallel to the Z axis is described as a Z direction. In the X direction, a direction toward the front of the vehicle is defined as a +X direction, and a direction toward the rear of the vehicle is defined as a −X direction. When an operator faces the +X direction, a right direction is defined as a +Y direction, and a left direction is defined as a −Y direction. In the Z direction, an upward direction is defined as a +Z direction, and a downward direction is defined as a −Z direction. Further, the X direction is referred to as an "axial direction", the −X direction side is referred to as "one side in the axial direction", and the +X direction side is referred to as "the other side in the axial direction".

First Embodiment

Figure 1:
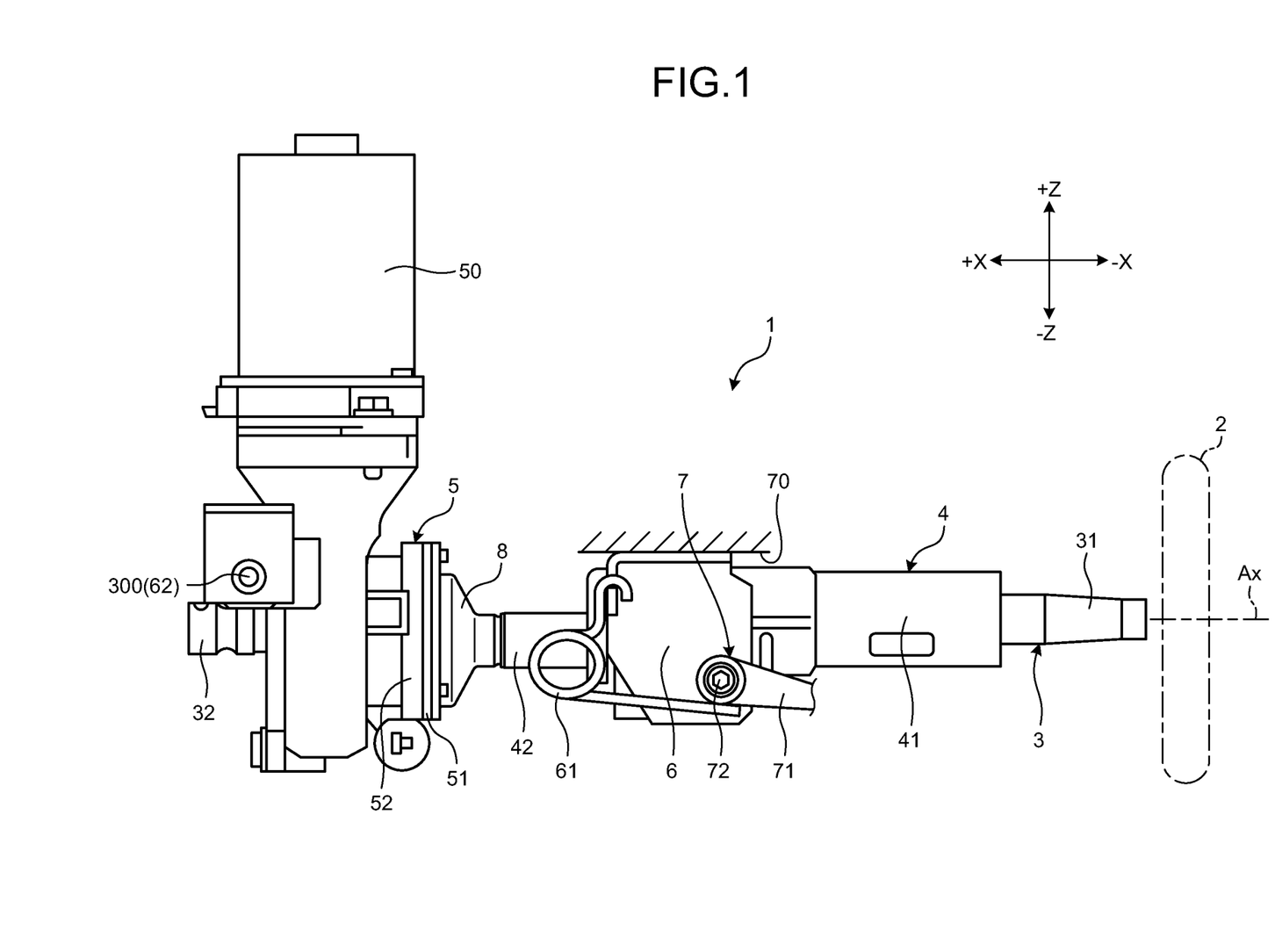
FIG. 1 is a schematic side view of a steering device according to a first embodiment.

FIG. 1 is a schematic side view of a steering device according to a first embodiment.

First, a basic configuration of a steering device 1 will be described. As illustrated in FIG. 1, the steering device 1 includes: a steering wheel 2; a steering shaft 3; a steering column 4; a gear box 5; a tilt bracket 6; a fastening mechanism 7; and a motor 50.

As illustrated in FIG. 1, the steering wheel 2 is connected to an end part of the steering shaft 3 in the −X direction. When a driver operates the steering wheel 2, the steering shaft 3 rotates about a central axis Ax, and an operation torque is applied to the steering shaft 3.

The gear box 5 is provided at an end part of the steering column 4 in the +X direction. The motor 50 is assembled to the gear box 5. The motor 50 is an electronic control unit (ECU) integrated motor. Thus, the steering device 1 according to this embodiment is an electric power steering device that assists the steering of the driver with the motor 50.

The steering shaft 3 includes an upper shaft 31 and a lower shaft 32. The upper shaft 31 and the lower shaft 32 are cylindrical shafts. The steering wheel 2 is attached to an end part of the upper shaft 31 in the −X direction. In other words, the steering wheel 2 is connected to one side in the axial direction of the steering shaft 3. An end part of the upper shaft 31 in the +X direction is externally fitted to the lower shaft 32. Further, the end part of the upper shaft 31 in the +X direction and an end part of the lower shaft 32 in the −X direction are spline-fitted to each other. Thus, the upper shaft 31 is slidable in the X direction with respect to the lower shaft 32.

As illustrated in FIG. 1, the steering column 4 is an outer cylinder that extends in the X direction and is disposed on the outer circumferential side of the steering shaft 3. The steering column 4 includes: an upper column 41; a lower column 42; and a fixing member 8. The upper column 41 is a column disposed near the steering wheel 2. The lower column 42 is a column disposed in the +X direction with respect to the upper column 41 and separated from the steering wheel 2. The upper column 41 and the lower column 42 have a tubular shape, and an end part of the upper column 41 in the +X direction is fitted to an end part of the lower column 42 in the −X direction. At the time of a secondary collision, the upper column 41 is movable in the +X direction with respect to the lower column 42. An end part of the lower column 42 in the +X direction is fixed to the gear box 5 via the fixing member 8. As described above, the fixing member 8 and the gear box 5 are separated from each other in FIG. 1, but the present disclosure is not limited thereto, and the fixing member 8 and the gear box 5 may be integrated with each other.

The gear box 5 includes a plate 51 and a main body part 52. The main body part 52 houses multiple gears therein. The plate 51 seals an opening of the main body part 52 in the −X direction. That is, the plate 51 is fixed to the fixing member 8 and the main body part 52 while being sandwiched between the fixing member 8 and the main body part 52. The fixing member 8 will be described later in detail.

A tilt bracket 6 is provided on the outer circumferential side of the steering column 4. The tilt bracket 6 is provided with the fastening mechanism 7. The fastening mechanism 7 includes: an operation lever 71; and a fastening shaft 72 that supports an end part of the operation lever 71. The operation of the operation lever 71 allows or regulates the movement of the upper column 41 in the Z direction and fixes the position of the steering wheel 2 in the Z direction. As described above, the steering device 1 according to this embodiment has a tilt function. Note that, the tilt bracket 6 is fixed to a vehicle body member 70. Further, a tilt spring 61 is a torsion coil spring, for example. The tilt spring 61 applies an upward (+Z direction) force to the steering column 4. This makes the steering column 4 less likely to fall downward (−Z direction) even when the fixing of the tilt position is released by the rotation operation of the operation lever 71. A pivot bracket 62 is fixed to a vehicle body side member and supports the steering column 4 so as to be swingable about a swing central axis 300. Thus, the steering column 4 is supported to be swingable in the tilt direction.

Figure 2:
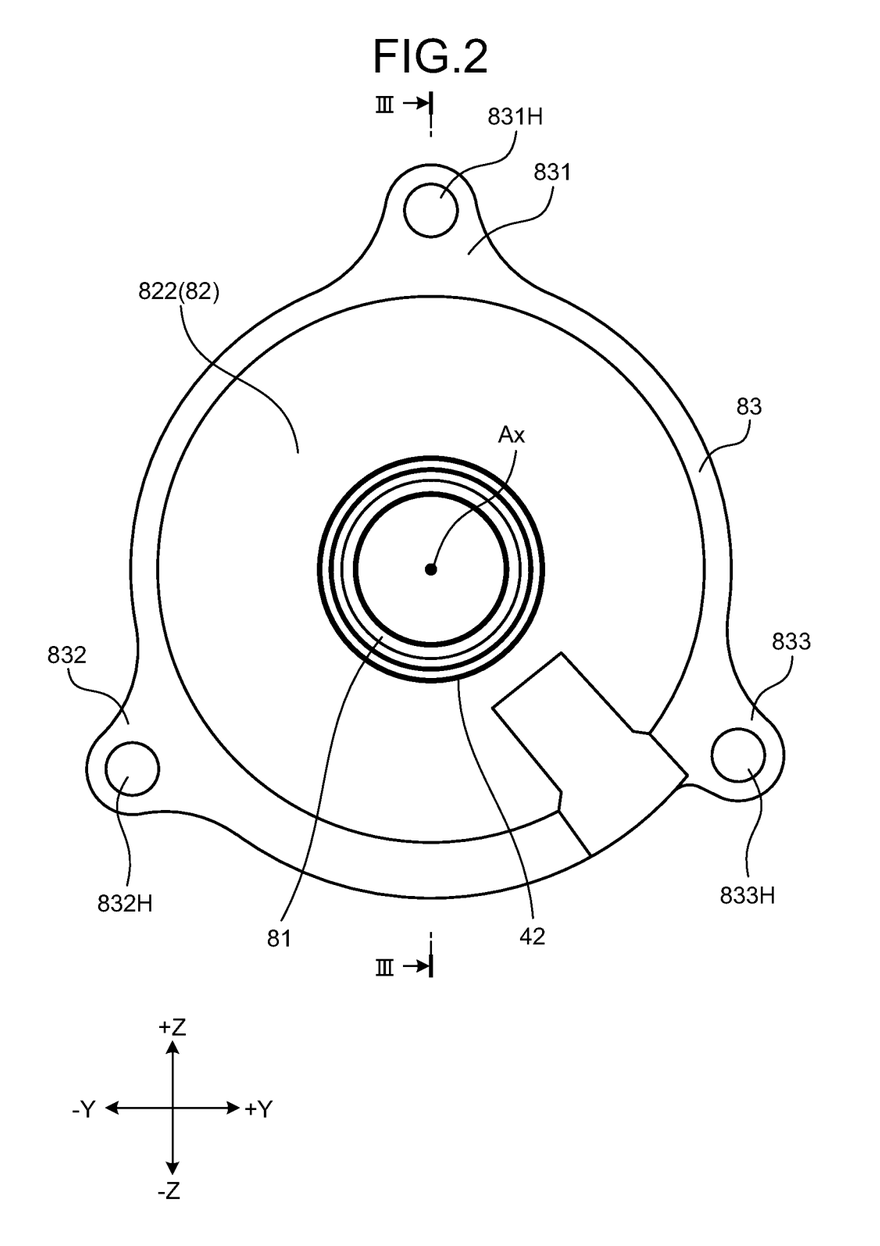
FIG. 2 is a front view of a lower column and a fixing member according to the first embodiment as viewed from a −X direction to a +X direction.
Figure 3:
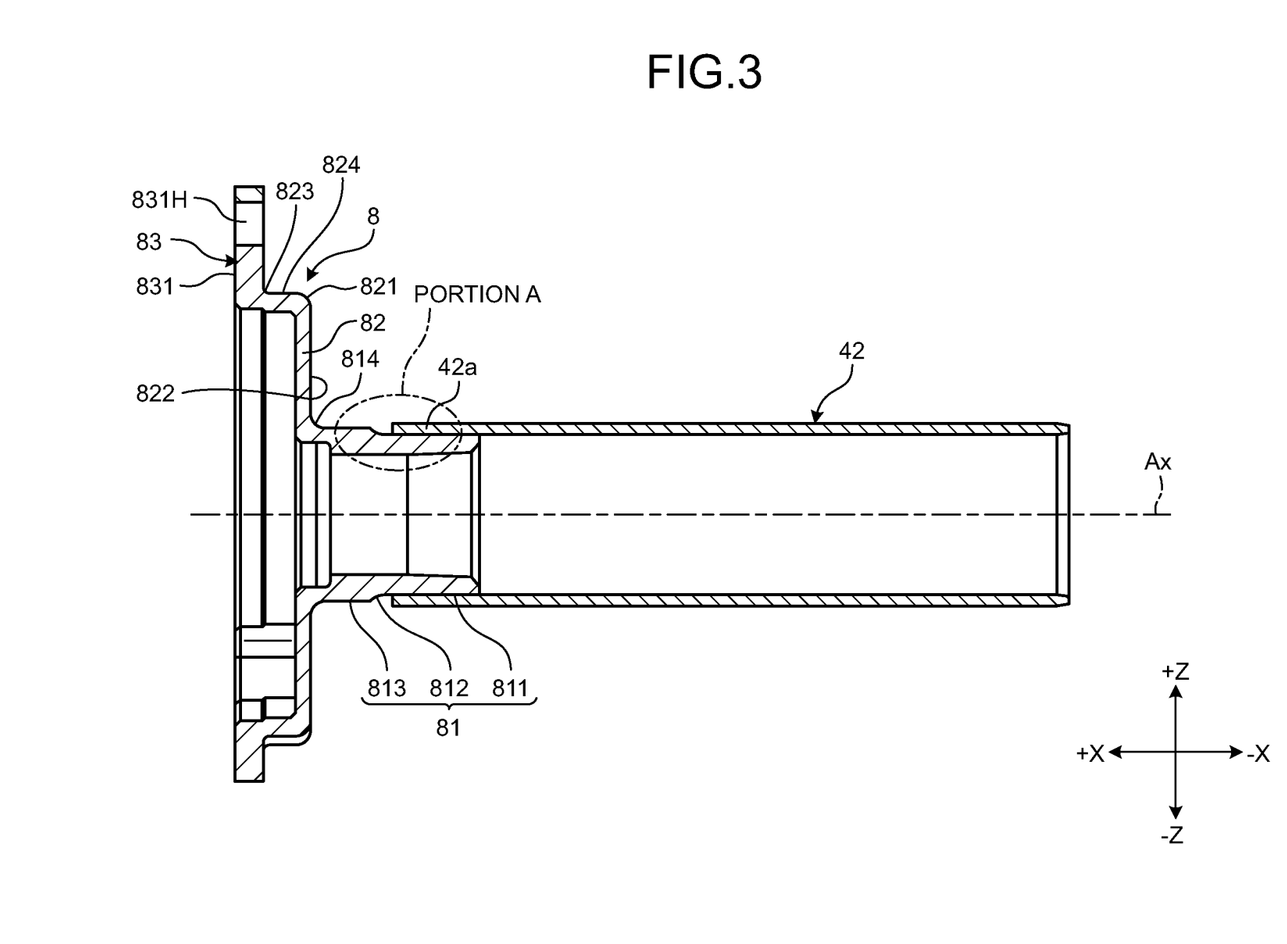
FIG. 3 is a cross-sectional view taken along a line III-III of FIG. 2.
Figure 4:
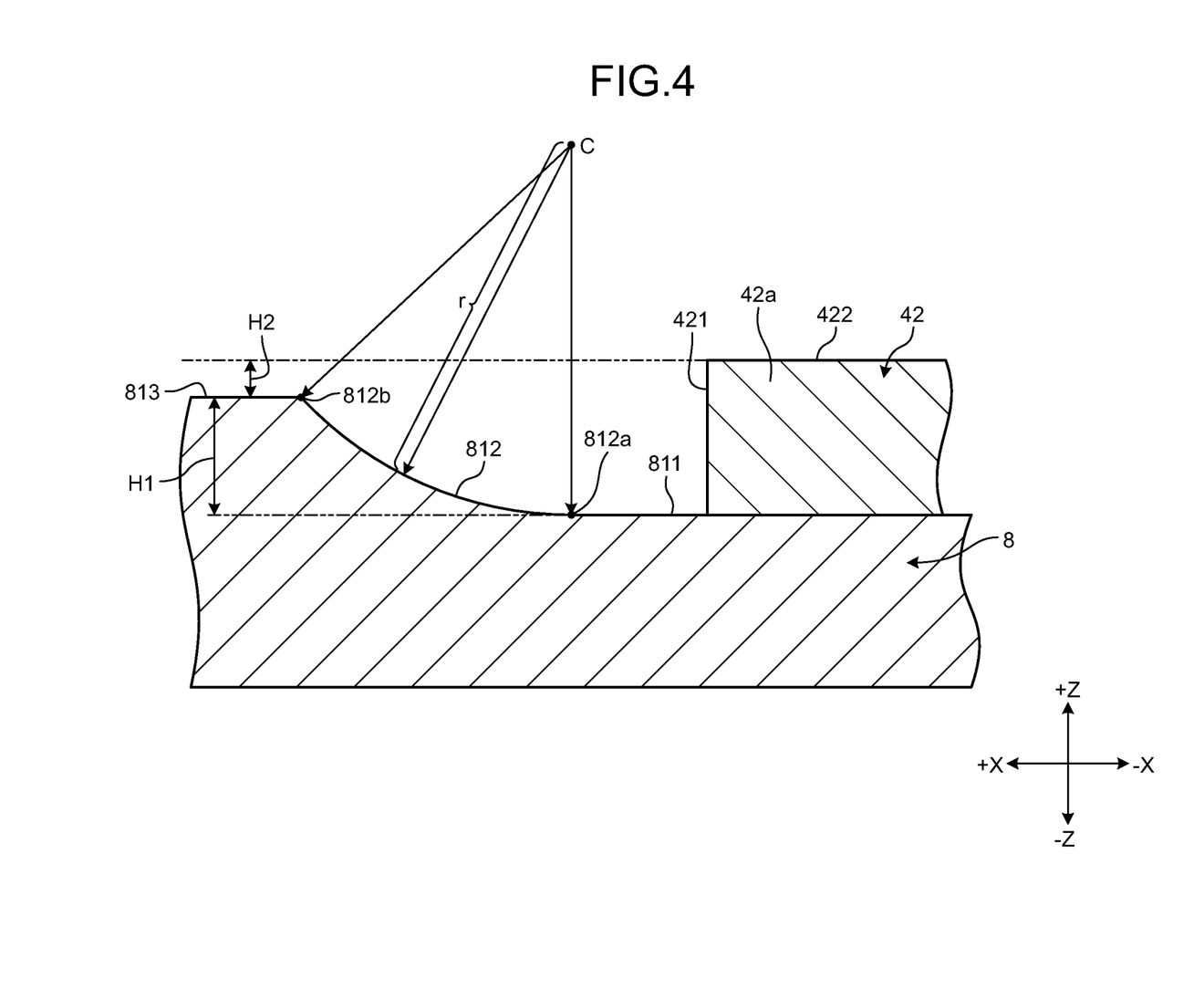
FIG. 4 is an enlarged schematic cross-sectional view of a portion A of FIG. 3.
Figure 5:
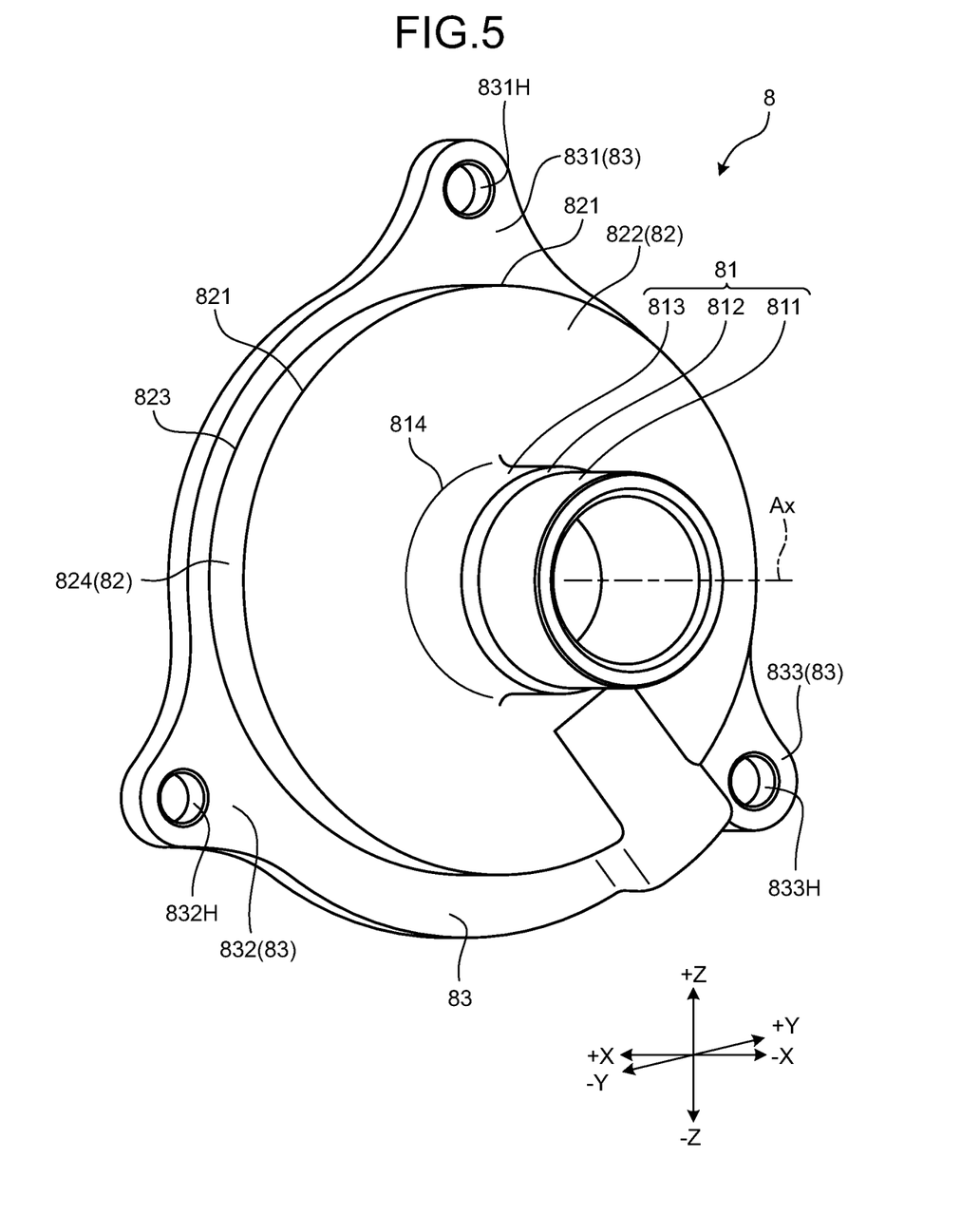
FIG. 5 is a perspective view of the fixing member according to the first embodiment as viewed from the −X direction to the +X direction.
Figure 6:
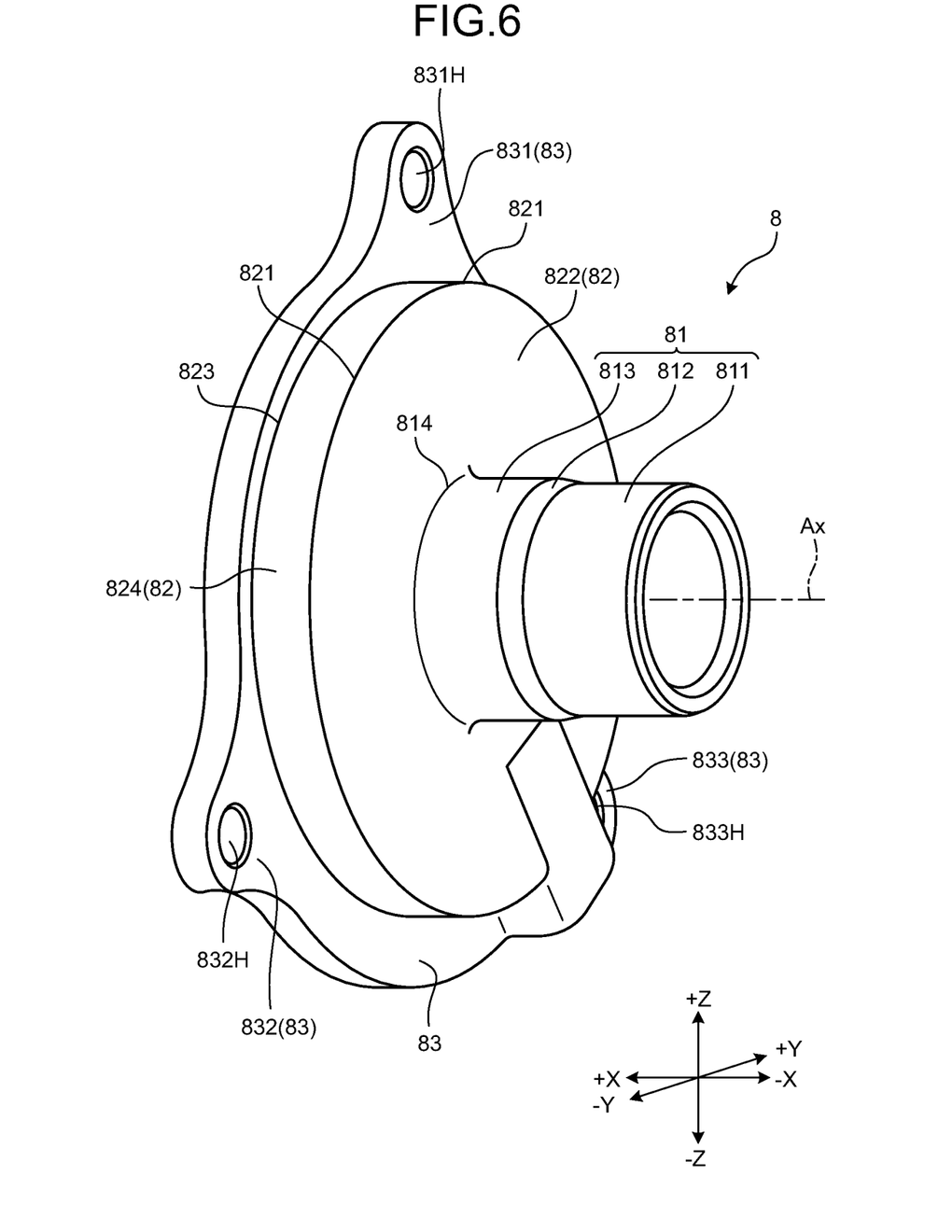
FIG. 6 is a perspective view of the fixing member according to the first embodiment as viewed from the −X direction to the +X direction.
Figure 7:
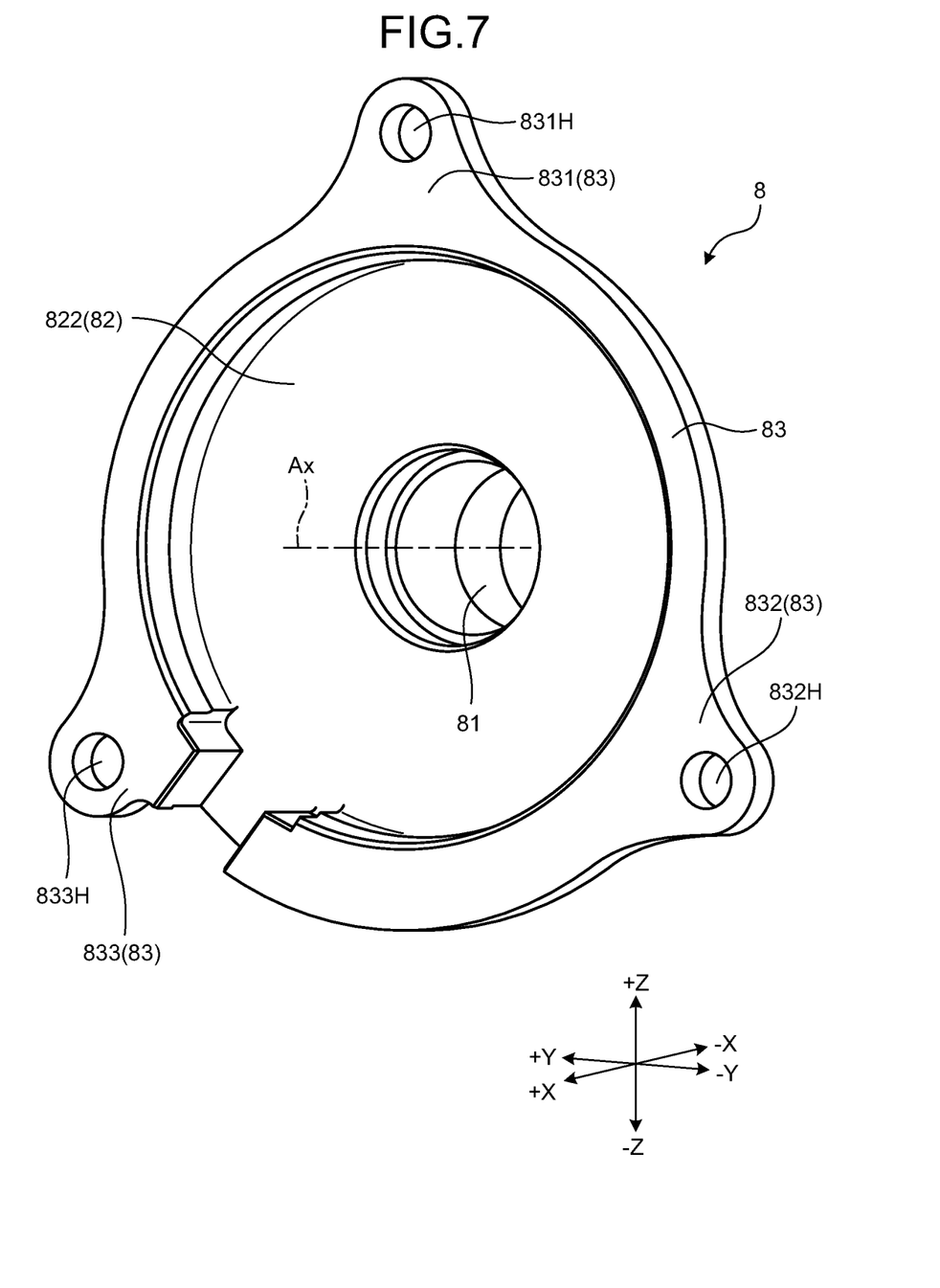
FIG. 7 is a perspective view of the fixing member according to the first embodiment as viewed from the +X direction to the −X direction.

FIG. 2 is a front view of the lower column and the fixing member according to the first embodiment as viewed from the −X direction to the +X direction. FIG. 3 is a cross-sectional view taken along a line III-III of FIG. 2. FIG. 4 is an enlarged schematic cross-sectional view of a portion A of FIG. 3. FIG. 5 is a perspective view of the fixing member according to the first embodiment as viewed from the −X direction to the +X direction. FIG. 6 is a perspective view of the fixing member according to the first embodiment as viewed from the −X direction to the +X direction. FIG. 7 is a perspective view of the fixing member according to the first embodiment as viewed from the +X direction to the −X direction.

As illustrated in FIGS. 2 and 3, the lower column 42 is a cylindrical member having a cylindrical shape along the circumferential direction about a central axis Ax. An end part 42a of the lower column 42 in the +X direction is fitted to the outer circumferential side of a cylindrical part 81 of the fixing member 8.

As illustrated in FIGS. 3, 5, 6, and 7, the fixing member 8 includes: the cylindrical part 81; a disk part 82; and a flange part 83. The fixing member 8 has an annular shape along the circumferential direction about the central axis Ax.

The cylindrical part 81 includes: a small diameter part 811; a curved part 812; and a large diameter part 813. As illustrated in FIGS. 3 and 4, the small diameter part 811 is located in the −X direction in the cylindrical part 81. In the cross section including the central axis Ax, an outer circumferential surface of the small diameter part 811 is a straight line along the axial direction. The curved part 812 is adjacent to the small diameter part 811 in the +X direction. The outer diameter of an outer circumferential surface of the curved part 812 increases toward the +X direction. That is, in the cross section including the central axis Ax, the outer circumferential surface of the curved part 812 has an arc shape. Specifically, in the cross section including the central axis Ax, the outer peripheral surface of the curved part 812 is an arc about a center C of a curvature radius and having a curvature radius r. The outer circumferential surface of the curved part 812 extends from an end 812a to an end 812b. Positions of the end 812a and the center C in the X direction are the same. In the cross section including the central axis Ax, a straight line connecting the end 812a and the center C is orthogonal to the outer circumferential surface of the small diameter part 811. Thus, a tangent line of the end 812a on the outer circumferential surface of the curved part 812 coincides with the outer circumferential surface of the small diameter part 811. The large diameter part 813 is adjacent to the curved part 812 in the +X direction. In the cross section including the central axis Ax, an outer circumferential surface of the large diameter part 813 is a straight line along the axial direction.

Here, the curvature radius r is larger than a difference H1 in the radial direction between the outer circumferential surface of the large diameter part 813 and the small diameter part 811. The difference H1 is a difference between the radius of the large diameter part 813 and the radius of the small diameter part 811, and is also referred to as a first length. For example, the curvature radius r is four times the difference H1. An end 421 of the lower column 42 in the +X direction is located close to the −X direction with respect to the end 812a. That is, the end 421 of the lower column 42 in the +X direction is disposed in the small diameter part 811 in the X direction. Note that, an outer circumferential surface 422 of the lower column 42 is located radially outside the outer circumferential surface of the large diameter part 813 and, in the cross section including the central axis Ax, has a difference H2 in the radial direction between the outer circumferential surface 422 of the lower column 42 and the outer circumferential surface of the large diameter part 813. The difference H2 is a difference between the radius of the outer circumferential surface 422 of the lower column 42 and the radius of the outer circumferential surface of the large diameter part 813, and is also referred to as a second length.

The disk part 82 has an annular shape extending outward in the radial direction about the central axis Ax. Specifically, a surface of the disk part 82 in the −X direction has: a flat surface 822 extending from an end 814 of the cylindrical part 81 in the +X direction outward in the radial direction to an end 821; and a cylindrical surface 824 extending from the end 821 to an end 823.

The flange part 83 extends outward in the radial direction. As illustrated in FIGS. 5 to 7, the flange part 83 has protruding parts 831, 832, and 833 protruding outward in the radial direction. The protruding parts 831, 832, and 833 are provided at three places at equal intervals along the circumferential direction about the central axis Ax. Through holes 831H, 832H, and 833H are provided in the protruding parts 831, 832, and 833, respectively. Bolts can be inserted into the through holes 831H, 832H, and 833H, and the flange part 83 is fixed to the gear box 5 via these bolts.

As described above, in the steering device 1 according to the first embodiment, the fixing member 8 includes the cylindrical part 81 extending in the axial direction. The cylindrical part 81 includes: the small diameter part 811 fitted to the inner circumferential side of the lower column 42; the curved part 812 adjacent to the other side in the axial direction of the small diameter part 811 and having an outer circumferential surface whose outer diameter increases toward the other side in the axial direction; and the large diameter part 813 adjacent to the other side in the axial direction of the curved part 812 and having an outer diameter larger than the outer diameter of the small diameter part 811. The difference between the radius of the large diameter part 813 and the radius of the small diameter part 811 is the difference H1 (first length). In the cross section including the central axis Ax, the outer circumferential surface of the curved part 812 is an arc having the curvature radius r larger than the difference H1 (first length), and the tangent line at the end on one side in the axial direction of the arc coincides with the outer circumferential surface of the small diameter part 811. The outer diameter of the large diameter part 813 is smaller than the outer diameter of the lower column 42.

At the time of the secondary collision, a force is applied from the driver to the steering wheel 2 toward the front of the vehicle (+X direction). In this case, the force is transmitted from the steering wheel 2 to the upper column 41 via the steering shaft 3. The upper column 41 is fitted to the outer circumferential side of the lower column 42, but when the force transmitted to the upper column 41 becomes larger than the force by which the upper column is fitted to the lower column 42, the upper column 41 slides forward (+X direction) on the outer circumferential side of the lower column 42.

Here, as illustrated in FIG. 4, when the outer diameter of the large diameter part 813 is smaller than the outer diameter of the lower column 42, the upper column 41 can move to the vicinity of the disk part 82 without interfering with the large diameter part 813 when the upper column 41 moves forward. Thus, the amount of movement (stroke amount) of the upper column 41 at the time of the secondary collision increases as compared with the case where the outer diameter of the large diameter part 813 is larger than the outer diameter of the lower column 42.

Note that, when the outer diameter of the large diameter part 813 is smaller than the outer diameter of the lower column 42, the thickness of the large diameter part 813 in the radial direction decreases, and the rigidity of the large diameter part 813 decreases. As a result, when the lower column 42 is fitted to the fixing member 8, when a force is applied to the fixing member 8 via the lower column 42 during traveling of the vehicle, and so forth, the force concentrates on the curved part 812 located between the large diameter part 813 and the small diameter part 811. For this reason, the outer circumferential surface of the curved part 812 is formed in an arc shape having a large curvature radius, and the step at the boundary portion between the curved part 812 and the small diameter part 811 is made as small as possible. As a result, even when the force concentrates on the curved part 812, it is possible to further suppress deformation and damage of the curved part 812.

The end 421 on the other side in the axial direction of the lower column 42 is located close to one side in the axial direction with respect to the end 812a on one side in the axial direction of the curved part 812.

When the lower column 42 is fitted to the cylindrical part 81 of the fixing member 8 at the time of manufacturing the steering device 1, if the lower column 42 is fitted to a region of the curved part 812, the shape of the curved part 812 is deformed. Thus, by arranging the lower column 42 at a position spaced apart from the curved part 812 in the axial direction, it is possible to suppress deformation of the curved part 812 at the time of manufacturing the steering device 1.

Second Embodiment

Figure 8:
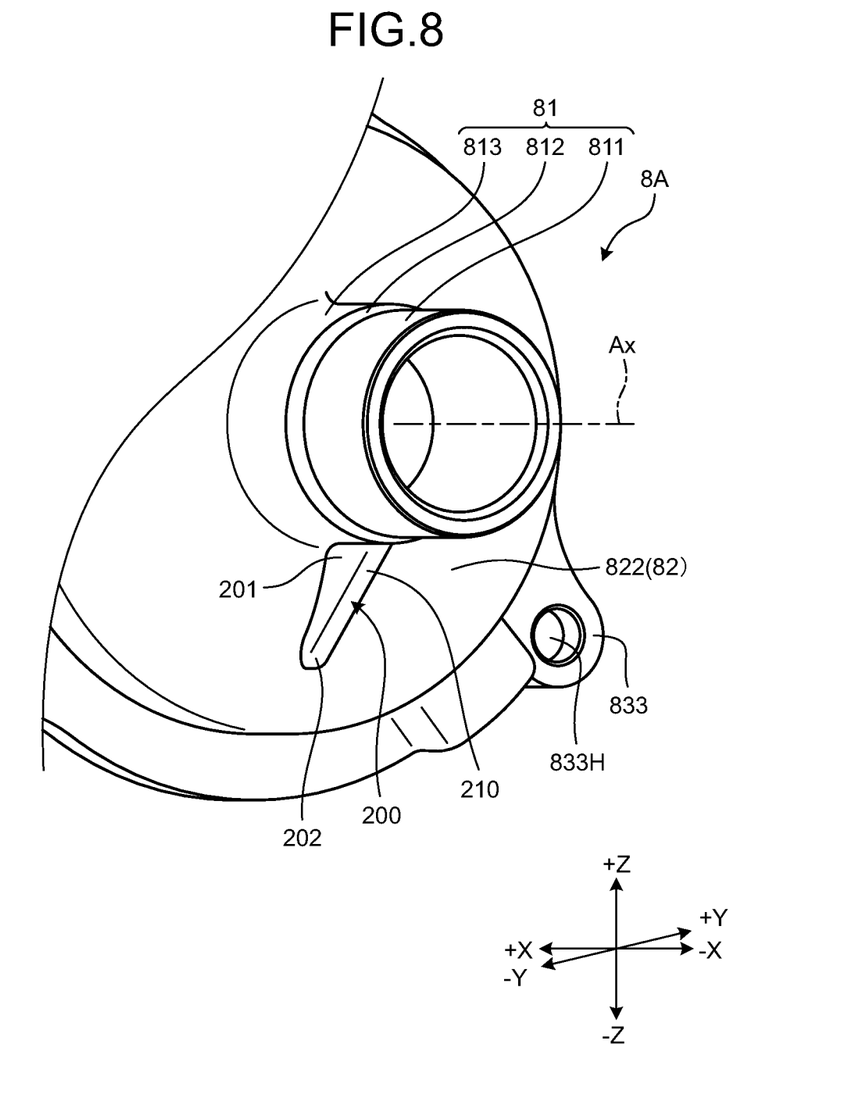
FIG. 8 is a perspective view of a fixing member according to a second embodiment as viewed from the −X direction to the +X direction.
Figure 9:
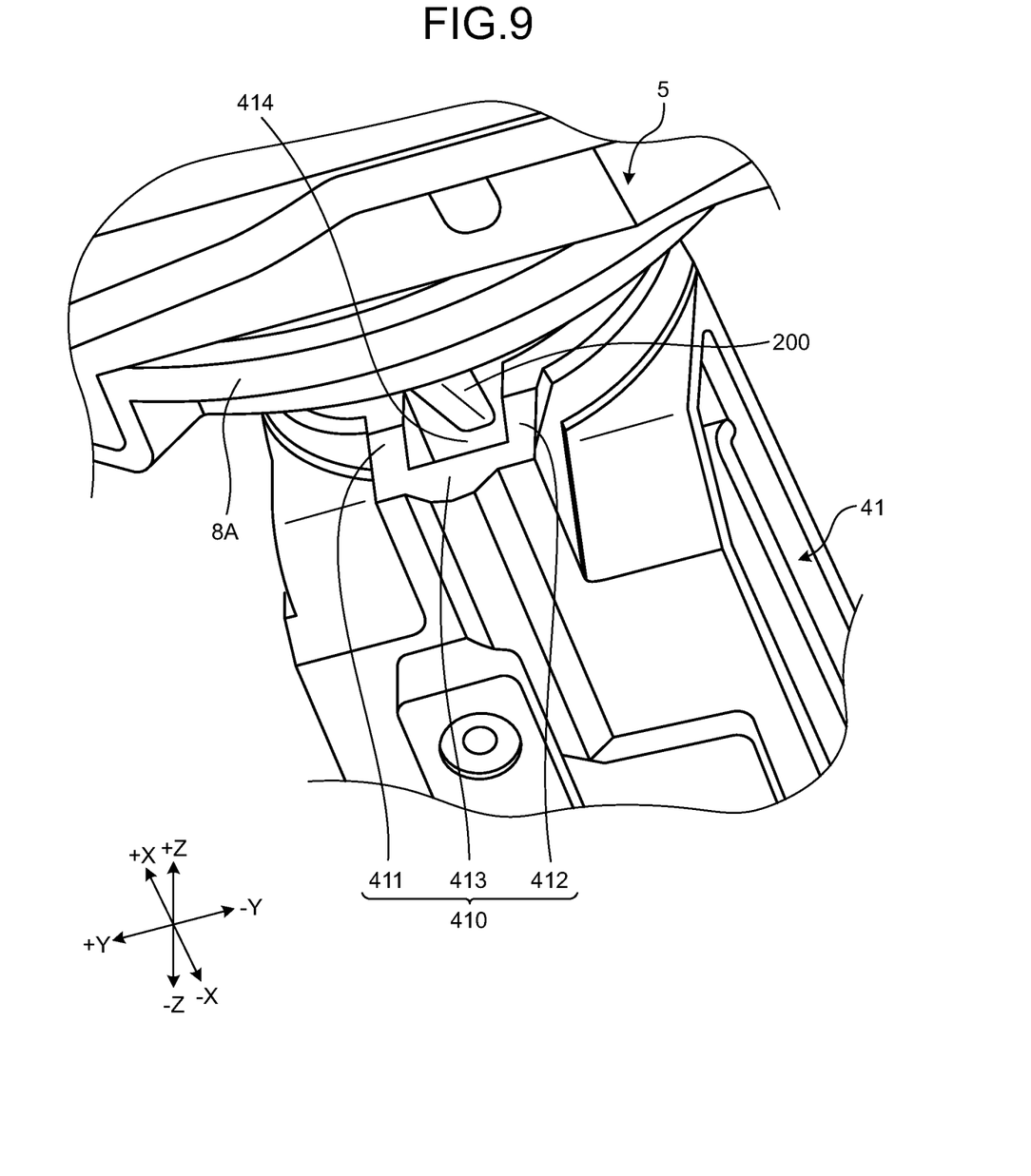
FIG. 9 is a perspective view of a peripheral part of the fixing member according to the second embodiment as viewed upward from a −Z direction to a +Z direction, and illustrates a state in which an upper column moves in the +X direction at the time of a secondary collision.
Figure 10:
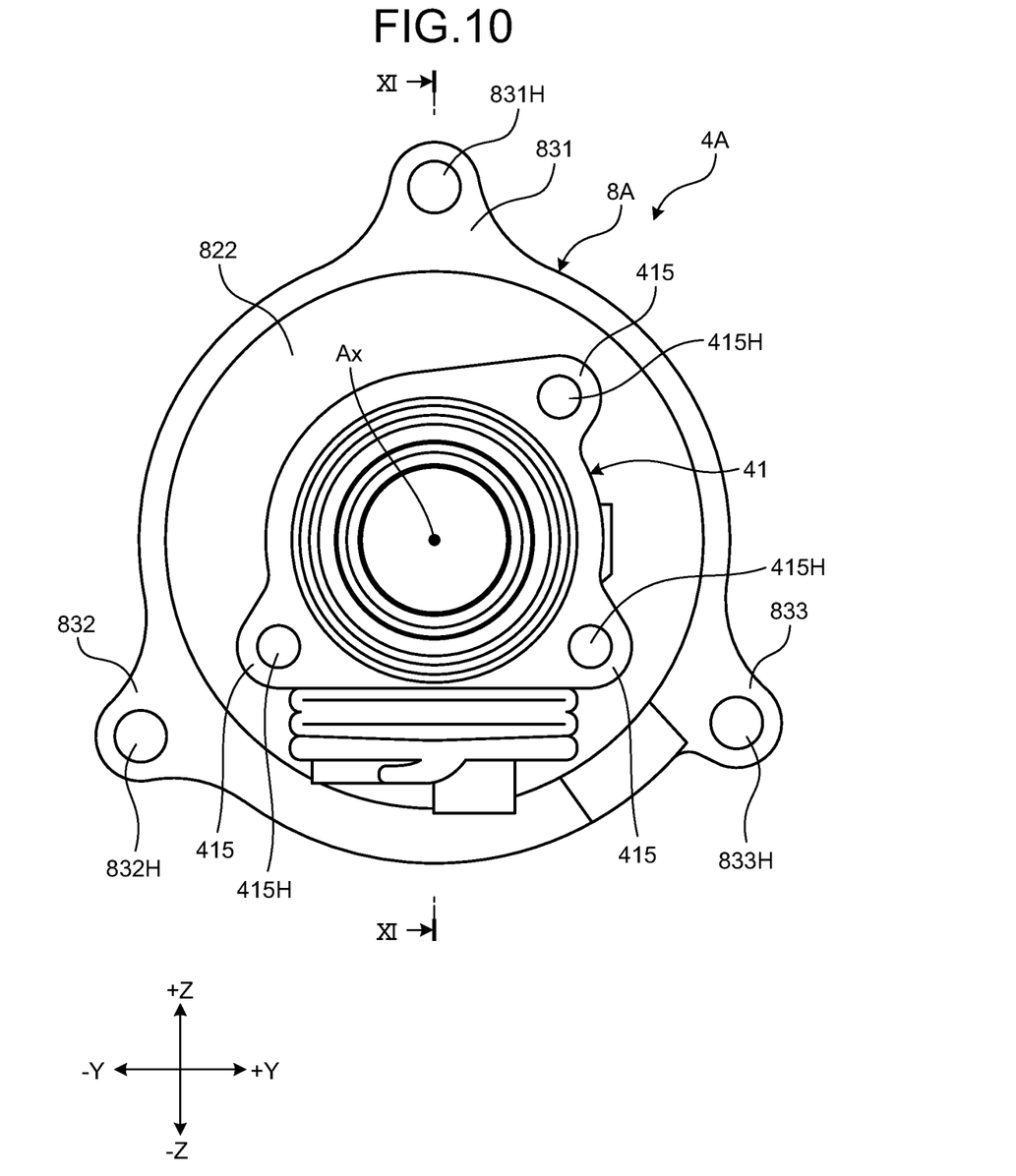
FIG. 10 is a front view of the lower column, the upper column, and the fixing member in the state of FIG. 9 as viewed from the −X direction to the +X direction.
Figure 11:
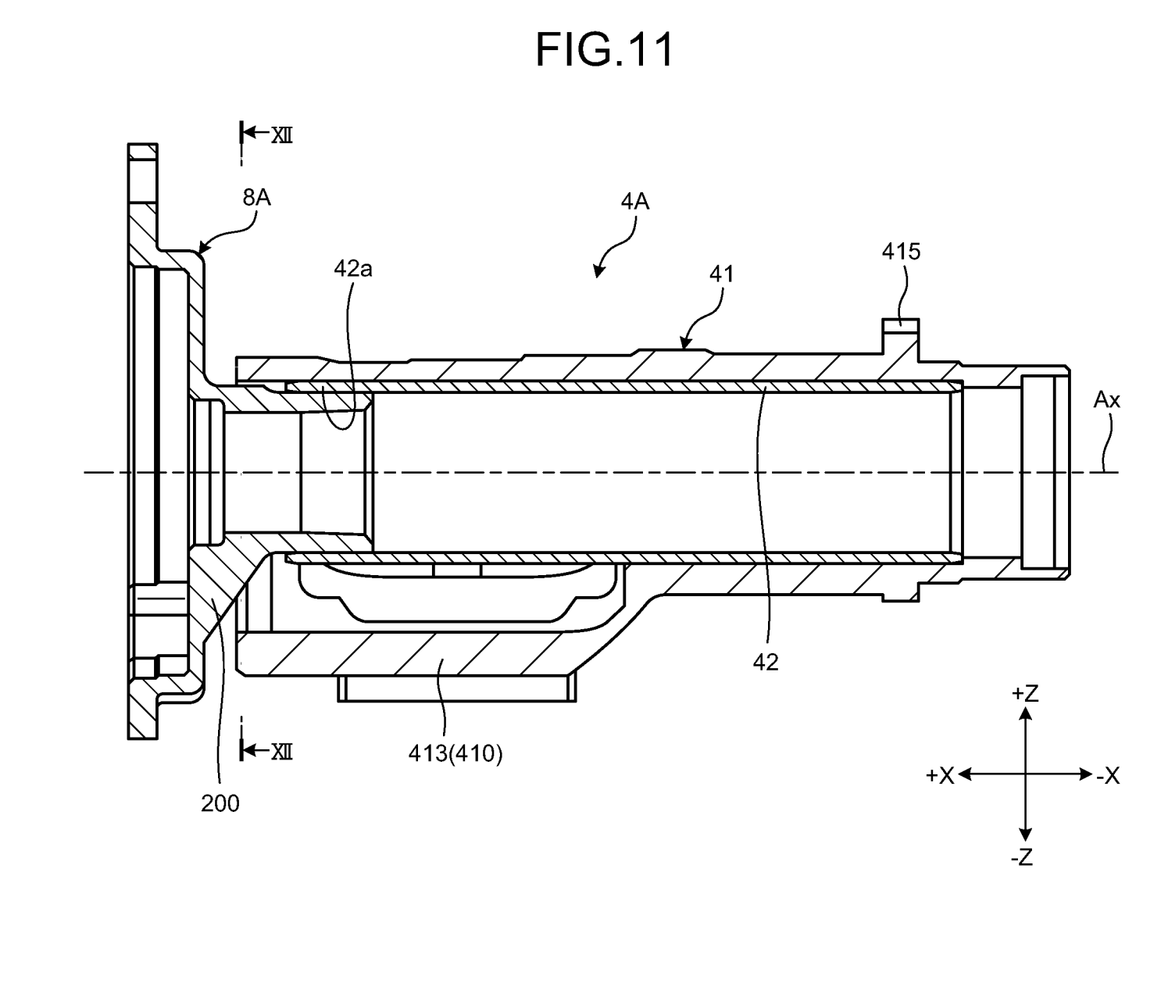
FIG. 11 is a cross-sectional view taken along a line XI-XI of FIG. 10.
Figure 12:
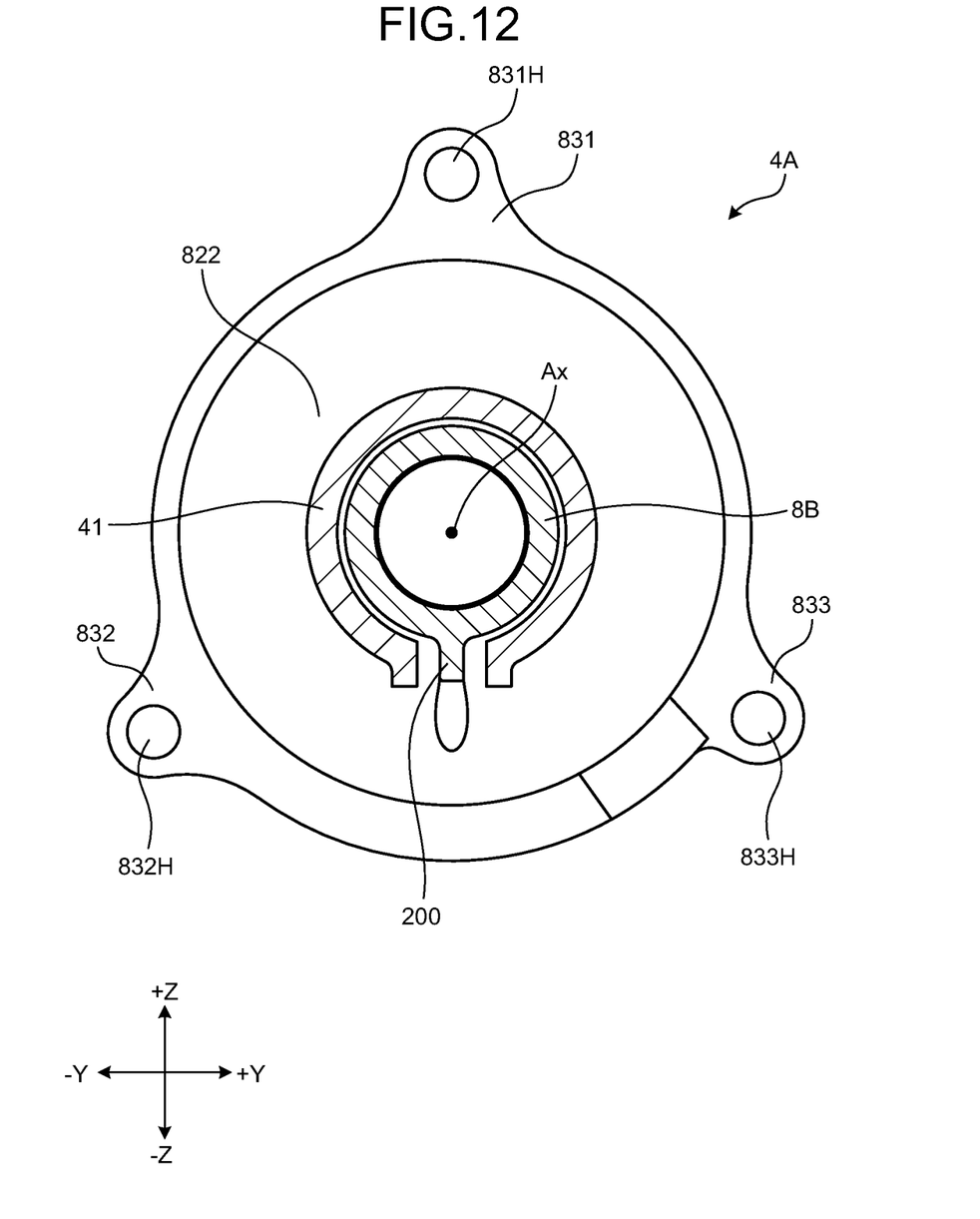
FIG. 12 is a cross-sectional view taken along a line XII-XII of FIG. 11.

Next, a second embodiment will be described. Note that, portions having the same structure as those of the first embodiment are denoted by the same reference signs, and description thereof is omitted. FIG. 8 is a perspective view of the fixing member according to the second embodiment as viewed from the −X direction to the +X direction. FIG. 9 is a perspective view of a peripheral part of the fixing member according to the second embodiment as viewed upward from the −Z direction to the +Z direction, and illustrates a state in which the upper column moves in the +X direction at the time of the secondary collision. FIG. 10 is a front view of the lower column, the upper column, and the fixing member in the state of FIG. 9 as viewed from the −X direction to the +X direction. FIG. 11 is a cross-sectional view taken along a line XI-XI of FIG. 10. FIG. 12 is a cross-sectional view taken along a line XII-XII of FIG. 11.

The second embodiment is different from the first embodiment in that a rib is provided on a surface side (−X direction side) of the fixing member. Details will be described below.

The disk part 82 of a fixing member 8A of a steering column 4A according to the second embodiment has a rib 200 on the surface side (one side in the axial direction, −X direction side). The rib 200 has a triangular shape when viewed from the side. The rib 200 protrudes from the flat surface 822 in the −X direction. The rib 200 extends radially outside the disk part 82. The rib 200 is fixed to the cylindrical part 81. The height of the rib 200 is the highest at an end 201 of the cylindrical part 81 on the large diameter part 813 side and the lowest at an end 202 on the outer side in the radial direction. Thus, an upper surface 210 of the rib 200 becomes lower from the end 201 on the large diameter part 813 side toward the outer side in the radial direction.

Meanwhile, FIGS. 9 to 12 illustrate a state in which the upper column 41 has moved to the fixing member 8A in the +X direction at the time of the secondary collision. Specifically, at the time of the secondary collision, a force is applied from the driver to the steering wheel 2 toward the front of the vehicle. In this case, the force is transmitted from the steering wheel 2 to the upper column 41 via the steering shaft 3. Normally, the upper column 41 is fitted to the lower column 42, but when the force transmitted to the upper column 41 becomes larger than the force by which the upper column is fitted to the lower column 42, the upper column 41 slides on the outer circumferential side of the lower column 42. As described above, at the time of the secondary collision, as illustrated in FIG. 11, a front end of the upper column 41 may be positioned in the vicinity of the fixing member 8A.

As illustrated in FIGS. 9 to 12, a protruding part 410 protruding downward is provided below (in the −Z direction) the upper column 41. The protruding part 410 has a U-shape in a cross section orthogonal to the central axis Ax. The protruding part 410 includes: a pair of left and right first plate part 411 and second plate part 412 extending in the Z direction; and a connecting plate 413 connecting a lower end of the first plate part 411 and a lower end of the second plate part 412. A recessed part 414 surrounded by the first plate part 411, the second plate part 412, and the connecting plate 413 has a height larger than the maximum height (that is, the height at the end 201 of the cylindrical part 81 on the large diameter part 813 side) of the rib 200.

Note that, as illustrated in FIGS. 10 and 11, three protrusions 415 protruding outward in the radial direction are provided on the outer circumferential surface of the end part of the upper column 41 in the −X direction. A through hole 415H penetrating in the plate thickness direction is formed in each protrusion 415.

As described above, in the steering device according to the second embodiment, the fixing member 8A is provided on the other side in the axial direction of the cylindrical part 81 and has the disk part 82 extending in the radial direction. The disk part 82 has the rib 200 protruding from the surface on one side in the axial direction thereof to one side in the axial direction and fixed to the cylindrical part 81.

Since the rib 200 extends radially outward in the −X direction from the disk part 82, the rigidity of the disk part 82 and the cylindrical part 81 is improved by the rib 200.

The upper column 41 has the protruding part 410, capable of housing the rib 200 therein, at the end part on the other side in the axial direction thereof. This makes it possible to suppress interference between the upper column 41 and the rib 200 when the upper column 41 moves forward with respect to the lower column 42 at the time of the secondary collision.

REFERENCE SIGNS LIST

1 STEERING DEVICE
2 STEERING WHEEL
3 STEERING SHAFT
4, 4A STEERING COLUMN
5 GEAR BOX
6 TILT BRACKET
7 FASTENING MECHANISM
8, 8A FIXING MEMBER
31 UPPER SHAFT
32 LOWER SHAFT
41 UPPER COLUMN
42 LOWER COLUMN
42a END PART
50 MOTOR
51 PLATE
52 MAIN BODY PART
61 TILT SPRING
62 PIVOT BRACKET
70 VEHICLE BODY MEMBER
71 OPERATION LEVER
72 FASTENING SHAFT
81 CYLINDRICAL PART
82 DISK PART
83 FLANGE PART
200 RIB
201 END
202 END
210 UPPER SURFACE
300 SWING CENTRAL AXIS
410 PROTRUDING PART
411 FIRST PLATE PART
412 SECOND PLATE PART
413 CONNECTING PLATE
414 RECESSED PART
415H THROUGH HOLE
421 END
811 SMALL DIAMETER PART
812 CURVED PART
812a END
812b END
813 LARGE DIAMETER PART
814 END
821 END
822 FLAT SURFACE
823 END
824 CYLINDRICAL SURFACE
831, 832, 833 PROTRUDING PART
831H, 832H, 833H THROUGH HOLE
Ax CENTRAL AXIS
C CENTER
H1 DIFFERENCE (FIRST LENGTH)
H2 DIFFERENCE (SECOND LENGTH)
r CURVATURE RADIUS

The invention claimed is:

1. A steering device comprising:
a steering shaft that extends along a central axis and is connected on one side in an axial direction thereof to a steering wheel;
a cylindrical steering column that is disposed on an outer circumferential side of the steering shaft and extends in the axial direction; and
a gear box that is disposed on the other side in the axial direction of the steering column and fixed to the steering column, wherein
the steering column includes:
an upper column;
a lower column that is disposed on the other side in the axial direction of the upper column and partially fitted to an inner circumferential side of the upper column; and
a fixing member that is provided on the other side in the axial direction of the lower column and fixed to the gear box,
the fixing member includes a cylindrical part that extends in the axial direction,
the cylindrical part includes:
a small diameter part that is fitted to an inner circumferential side of the lower column;
a curved part that is adjacent to the other side in the axial direction of the small diameter part and has an outer circumferential surface whose outer diameter increases toward the other side in the axial direction thereof; and
a large diameter part that is adjacent to the other side in the axial direction of the curved part and has an outer diameter larger than the outer diameter of the small diameter part,
in a cross section including the central axis, the outer circumferential surface of the curved part is an arc, and
the outer diameter of the large diameter part is smaller than an outer diameter of the lower column.

2. The steering device according to claim 1, wherein
a difference between a radius of the large diameter part and a radius of the small diameter part is a first length, and in the cross section including the central axis, a curvature radius of the arc being the outer circumferential surface of the curved part is larger than the first length.

3. The steering device according to claim 1, wherein an end on the other side in the axial direction of the lower column is located close to the one side in the axial direction with respect to an end on the one side in the axial direction of the curved part.

4. The steering device according to claim 1, wherein the fixing member includes a disk part that is provided on the other side in the axial direction of the cylindrical part and extends in a radial direction, and the disk part includes a rib that protrudes from a surface on the one side in the axial direction thereof to the one side in the axial direction and radially outward.

5. The steering device according to claim 4, wherein the upper column includes a protruding part, capable of housing the rib therein, at an end part on the other side in the axial direction thereof.

6. The steering device according to claim 1, wherein, in a cross section including the central axis, a tangent line at an end on the one side in the axial direction of the arc in the outer circumferential surface of the curved part coincides with an outer circumferential surface of the small diameter part.

* * * * *